Aug. 4, 1925.
Re. 16,132
A. J. LOEPSINGER
AUTOMATIC SPRINKLER
Original Filed March 18, 1919
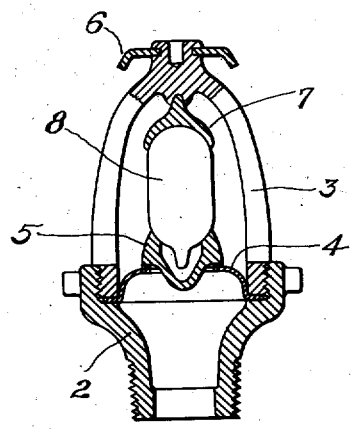
INVENTOR.
Albert J. Loepsinger
BY
Mitchell, Chadwick & Kent,
ATTORNEYS Reissued Aug. 4, 1925. Re. 16,132

UNITED STATES PATENT OFFICE.

ALBERT J. LOEPSINGER, OF PROVIDENCE, RHODE ISLAND, ASSIGNOR TO GENERAL FIRE EXTINGUISHER COMPANY, OF NEW YORK, N. Y., A CORPORATION OF NEW YORK.

AUTOMATIC SPRINKLER.

Original No. 1,464,622, dated August 14, 1923, Serial No. 283,295, filed March 18, 1919. Application for reissue filed February 3, 1925. Serial No. 6,667.

*To all whom it may concern:*

Be it known that I, ALBERT J. LOEPSINGER, a citizen of the United States, and resident of the city of Providence, formerly of Cranston, in the county of Providence and State of Rhode Island, have invented certain new and useful Improvements in Automatic Sprinklers; and I do hereby declare the following specification, taken in connection with the accompanying drawing, forming a part of the same, to be a full, clear, and exact description thereof.

My invention relates to automatic sprinklers of the type in which the characteristic feature is the employment for normally holding the sprinkler closed of a frangible vessel containing a bursting charge which will fracture the vessel when heated to a predetermined temperature thereby opening the sprinkler and releasing the water from the sprinkler system. Although certain of the advantages of automatic sprinklers of this general type have long been recognized, a satisfactory and commercially successful sprinkler has not been heretofore produced, because of the liability of premature fracture of the frangible vessel.

The object of this invention is to produce an automatic sprinkler of this type provided with a frangible vessel as a valve holding means for normally holding the sprinkler closed capable of confining the bursting charge in a reliable and positive manner until the temperature reaches a predetermined operating point.

Several cycles or modes of operation in which the bursting charge acts to shatter its frangible vessel are known in the prior art, two of which are disclosed in applicant's Patents Nos. 1,290,602 and 1,290,762. Sealing of the frangible vessel or bulb therein described is best effected by a fusion of the relatively slender neck usually provided for that purpose. To accomplish this fusion requires the application of a degree of heat far in excess of the predetermined bursting temperature, and inasmuch as at this latter temperature, the bursting charge, therein described as a liquid, must entirely fill the bulb, the body of the bulb must be kept at a temperature well below the operating point during sealing. This great temperature difference ordinarily results in setting up internal stresses in the bulb due to expansion and contraction that render the bulb liable to premature fracture and unfit for use. Once imposed these stresses cannot be removed or equalized except by heating the entire vessel to a temperature as high or higher than that required for sealing, and then slowing cooling. This process of annealing is impossible in the present art because bursting customarily occurs at a temperature but slightly above that usual in the location protected by the sprinklers.

I have succeeded in producing a frangible vessel free from the objection referred to and having in addition certain other advantages over any heretofore proposed. To accomplish this, I form the frangible vessel from a material having such a low coefficient of expansion that said vessels are substantially free from internal cooling stresses or, in other words, are exothermic after sealing despite the severe treatment and requirements of the sealing process. The material that I prefer to employ is fused quartz of the transparent form, usually called quartz glass, although the milky translucent form containing air cells, commonly known as fused silica, may be employed.

A vessel made from quartz is substantially free from internal cooling stresses even after sealing and well adapted to resist sudden changes in temperature, as well as shocks and vibration during use, without danger of cracking. The absence of cooling stresses also increases the ability of the frangible vessel to resist external forces, such for example, as are imposed upon it in consequence of the pressure in the sprinkler system. When so employed the total stress in the material is the algebraic sum of that due to cooling and to the external force imposed. When the former is absent it is clear that the entire ultimate strength of the material is available for holding the sprinkler closed and for reliably confining the bursting charge.

Quartz is also a comparatively good conductor of heat so that bulbs made from it closely follow any rise of temperature due to the occurrence of a fire, and operate in a prompt and effective manner before the fire has gained much headway.

Quartz also possesses a very considerable strength, as a result of which bulbs made therefrom can be made correspondingly thin thus producing a further gain in thermal sensitiveness.

When installed in a dust ladened atmosphere sprinklers and other similar apparatus often become coated to such an extent, particularly if the dust particles possess the property of bonding when moistened by water or other condensable liquid, that opening on the occurrence of a fire is often seriously retarded and sometimes prevented. When quartz is employed this liability is greatly lessened because moisture does not readily condense on the surface of this material.

In ordinary practice, with the use of soldered link sprinklers, it has been found necessary to install so-called high degree heads, when the heads are exposed to the direct rays of the sun, especially under skylights, in monitors, saw-tooth roofs and the like, in order to prevent accidental opening due to radiant heat. In a majority of such cases the heat rays pass through glass before striking the sprinkler. I have discovered that vessels made from quartz will pass, to a great extent, and with but slight heating of the bulb, all the rays that have previously been filtered through such a glass screen. That is to say, rays of radiant heat having once passed through a glass window or skylight have but little heating effect on a vessel formed from quartz. This property of quartz also becomes of importance in so called exposure hazards. Suppose, for example, that a building in close proximity to one containing automatic sprinklers is in flames. The radiant heat passing through the windows of the sprinklered risk may easily open a great many sprinklers. As the operating temperature is usually only about 165° F. this opening occurs long before there is any danger of actual fire, as very few materials ignite at below 500° F. Such premature opening, besides causing extensive water damage, may so cripple the water supply as to make it ineffective for fire fighting.

When a vessel employs the cycle described in my Patent No. 1,290,602, it is clear that the shattering action increases in effectiveness with the amount of gas in the vessel at the time of sealing. As the space not occupied by the liquid determines the gas volume, cooling of the body of the vessel at the time of sealing and consequent contraction of the contained liquid beyond the point necessary for successful sealing is desirable. With quartz, this cooling may be carried to any desired low temperature and a correspondingly sharp shattering action produced at the predetermined bursting temperature. This desirable result is further enhanced by the low coefficient of expansion of quartz because cooling results in a contraction of the liquid, without measurably lessening the cubical contents of the containing vessel.

Heretofore all automatic sprinklers used commercially have employed easily fusible solder to hold them normally closed, and their opening temperature has been determined by the physical properties of the few alloys available for solder, rather than by the conditions of service. Alloys having melting points below approximately 164° F. have been found too weak and otherwise unreliable for the purpose, and in consequence so called ordinary or low degree sprinklers, which constitute about 90% of the entire number in use have employed solders fusing at the temperature mentioned, although degrees of heat considerably below this point are abnormal and indicate the presence of a fire. Inasmuch as a sufficient amount of gas to produce a satisfactory shattering action at any desired low temperature may be sealed in the bulb, as already explained, it is apparent that automatic sprinklers made in accordance with my present invention may be set to operate at a temperature lower than the solder-link sprinklers, and but slightly above the normal of the locality where they are installed and in consequence release an extinguishing medium upon the fire sooner than has heretofore been possible.

In cycles requiring the fracture of the vessel by liquid pressure, as for example by the pressure exerted by carbon tetrachloride as disclosed in my Patent No. 1,290,602, already referred to, I have found that fracture does not occur at the moment of entire filling of the vessel by the contained liquid, but at a considerably higher temperature. Since the liquid expands with almost irresistible force, the vessel must increase in volume somewhat during the interval between complete filling and final fracture. Two properties ordinarily operate to permit this increment of volume, viz: elasticity and thermal expansion. With quartz no noticeable increase occurs from the latter cause, and as a result the length of interval between complete filling and final fracture is much reduced. This is very desirable because, when entirely filled the walls of the vessel are under severe stress, and unable to resist external force to the same extent as at lower temperatures.

Once sealed it is important that vessels of this character retain the desired predetermined bursting temperature. To ensure this the volume of the bulb must be unaffected by repeated expansion and contraction over wide ranges of temperature during years of service. Quartz bulbs meet this requirement because of the absence of so called thermal lag.

A form of sprinkler in which my invention may be embodied is illustrated in the accompany drawing, in which the figure shows the sprinkler mainly in vertical section.

The sprinkler illustrated comprises a body portion 2, a yoke 3, screwed at one end into the body portion 2, a resilient valve seat 4 clamped between the yoke and body portion and having a central perforation, a valve 5 resting on the valve seat 4 and normally closing the perforation therein, and a deflector 6 carried by the free end of the yoke, all of the parts above mentioned being of familiar and well known construction except as hereinafter described. In addition, the sprinkler includes a cap-piece 7 shaped like an inverted cup and bearing against the under side of the yoke at its top, and a frangible vessel 8 made of quartz and interposed between the cap-piece 7 and the valve 5, where it serves as a strut to hold the valve against its seat under normal conditions. The rounded upper end of the vessel 8 is received in the concavity of the cap-piece 7 and held in position thereby, the cap-piece itself being centered and held in position by a shallow recess in the yoke in which its rounded upper end rests loosely. The lower end of the vessel 8 is shown as resting on an annular seat provided at the top of the valve 5, which has a recess formed in it to receive the neck of the vessel and protect it from accidental breakage. The parts are so proportioned that when they are assembled and the yoke is screwed into the body portion to clamp the valve seat 4 in place, the latter is flexed slightly by the valve 5 and held tightly against the valve by its own elasticity which is eventually supplemented by the pressure in the sprinkler pipe system to which the sprinkler is attached. In operation, when the vessel is fractured the cap-piece 7 drops out of the yoke and is thrown aside with the valve and the fragments of the vessel, thus leaving a free water way for the discharge from the sprinkler.

The frangible vessel 8 is preferably given a cylindrical form as shown and may be conveniently made from quartz glass tubing, which is commercially available having a diameter and wall thickness suitable for the vessels themselves. In practice I take such a quartz glass tube and apply heat to a narrow zone near one end. The source of heat may be a number of oxy-hydrogen flames, and as even heating is desired it is well to revolve the tube. This is continued until the quartz is softened, and the walls of the tube collapsed toward the center to a considerable extent.

I then slowly draw the short portion away from the main body of the tube, and when the heated zone so drawn is of a desired diameter and bore to form a neck convenient for filling and sealing I quickly draw it out of the flames and thus separate it. The neck so formed is of diminishing diameter and terminates in a long thread, which on cooling may be easily broken off as desired leaving an open end portion for the neck. The end of the main portion of the tube remains in the flames and without further manipulation closes to form the reverse end of a vessel.

When this has been done, the tube is then fed forward a proper amount to make a vessel of any desired length. On repeating the heating and drawing process just described, the portion separated, having one end closed with the other terminating in the desired neck, is a completed vessel and ready for the introduction of the bursting charge and the sealing of the vessel in the manner, for example, explained and disclosed in either of my patents hereinbefore referred to. The process may be repeated until the entire tube is used up. While I have shown and described the vessel 8 as cylindrical, it will be understood that the same may be made of any desired form or shape.

While I have shown my invention as applied to one form or type of automatic sprinklers, it will be evident that the above described frangible vessel is adapted for use in various other forms and types of sprinklers. It will also be understood that said frangible vessel and its contents, in which the novelty of my invention primarily resides, constitutes an article of manufacture which can be used as a thermostatic release in a variety of devices intended to operate at a predetermined temperature, and that other methods for making the bulb may be employed. It should further be understood that my present invention is not directed toward methods of manufacture.

What I claim as my invention and desire to secure by Letters Patent is:

1. An automatic sprinkler comprising, as a means for normally holding the sprinkler closed, a frangible vessel formed from quartz and containing a bursting charge adapted to fracture the vessel when heated to a predetermined temperature.

2. An automatic sprinkler comprising, as a means for normally holding the sprinkler closed, a frangible vessel formed from transparent quartz and containing a bursting charge adapted to fracture the vessel when heated to a predetermined temperature.

3. An automatic sprinkler comprising, as a means for normally holding the sprinkler closed, a frangible vessel made of quartz and nearly filled with carbon tetrachloride.

4. An automatic sprinkler comprising a frame, a valve, a separable cap-piece positioned on the frame, and a quartz vessel interposed between the cap-piece and the valve and seated thereon, said vessel being provided with liquid contents adapted to fracture it when sufficiently heated.

5. An article of manufacture comprising a frangible vessel formed from quartz and containing a bursting charge adapted to fracture the vessel when heated to a predetermined temperature.

6. An article of manufacture comprising a frangible vessel formed from transparent quartz and containing a bursting charge adapted to fracture the vessel when heated to a predetermined temperature.

7. An automatic sprinkler comprising as a means for normally holding the sprinkler closed, a frangible vessel containing a liquid charge adapted by expansion to fill and fracture the vessel at a predetermined sprinkler-operating temperature; said vessel having a fused closure and being made of material having a co-efficient of expansion so near 0 that the heating of part to the temperature of fusing while the remainder continues cool, and the cooling of said part, leave the material substantially free of internal stresses.

8. An article of manufacture comprising a frangible vessel containing a liquid charge adapted by expansion to fill and to fracture the vessel when heated to a predetermined temperature; said vessel having a fused closure and being made of material having a co-efficient of expansion so near 0 that the heating of part to the temperature of fusing while the remainder continues cool, and the cooling of said part, leave the material substantially free of internal stresses.

9. An article of manufacture comprising a frangible vessel containing a bursting charge adapted to fracture the vessel when heated to a predetermined temperature; said vessel having a fused closure and being made of material having a co-efficient of expansion so near 0 that the heating of part to the temperature of fusing while the remainder continues cool, and the cooling of said part, leave the material substantially free of internal stresses.

Signed at Providence, Rhode Island, this fifteenth day of January, 1925.

ALBERT J. LOEPSINGER.